Oct. 29, 1946.     E. K. CLARK     2,410,013
HEATING APPARATUS
Filed May 15, 1942     2 Sheets-Sheet 1

WITNESSES:

INVENTOR
EARL K. CLARK
BY
ATTORNEY

Oct. 29, 1946.　　　　E. K. CLARK　　　　2,410,013
HEATING APPARATUS
Filed May 15, 1942　　　　2 Sheets-Sheet 2

WITNESSES:
F. E. Browder
A. H. Daugherty

INVENTOR
EARL K. CLARK
BY
ATTORNEY

Patented Oct. 29, 1946

2,410,013

UNITED STATES PATENT OFFICE 2,410,013

HEATING APPARATUS

Earl K. Clark, Mansfield, Ohio, assignor to Westinghouse Electric Corporation, East Pittsburgh, Pa., a corporation of Pennsylvania Application May 15, 1942, Serial No. 443,032

1 Claim. (Cl. 219—20)

This invention relates to a control for an electric heating unit, such as the surface unit of an electric range, and it has for an object to provide an improved control.

The control commonly used comprises a switch actuated by a rotary knob and having an "off" position, a position of maximum heat, and several positions of reduced heat. To initiate a cooking operation, the knob is rotated from the "off" position to one of the heat positions, and to terminate the cooking operation the knob is rotated to the "off" position. The knob may also be shifted from one heat position to another during the cooking operation. This type of control is generally satisfactory but it has certain limitations or disadvantages. One of these is that the current may be turned on regardless of whether there is a cooking utensil or other article to be heated on the heating unit, thereby permitting a waste of electric current. Also, the user may remove the cooking utensil from the heating unit and forget to turn the switch to the "off" position, thereby resulting in a waste of electric current. A further disadvantage is that, each time a cooking operation is initiated or terminated, it is necessary to effect rotary movement of the knob and to note the position to which the knob is actuated; whereas, the easiest control operation is one wherein a control element is moved more or less in a straight line to the end of its travel, such as pushing a button.

It is an object of the present invention to provide a control for a heating unit whereby a complete cooking operation may be carried out by a single actuation of a control member, such as pushing a button.

A further object is to provide a control including a control element which may be adjusted to provide varying degrees of heat, and which need not be reset to terminate the cooking operation.

Another object is to provide a control including a control element which may be adjusted to provide varying degrees of heat, and which need not be reset to terminate the cooking operation, nor to initiate a subsequent cooking operation if the same degree of heat is desired.

A further object is to provide a control wherein the supply of current to the surface unit is controlled by the placing of a cooking utensil or the like on the surface unit, but wherein provision is made for guarding against unintended supply of current to the surface unit when placing a cooking utensil or other article thereon for storage purposes only.

These and other objects are effected by the invention as will be apparent from the following description and claim taken in connection with the accompanying drawings, forming a part of this application, in which:

Figure 1:
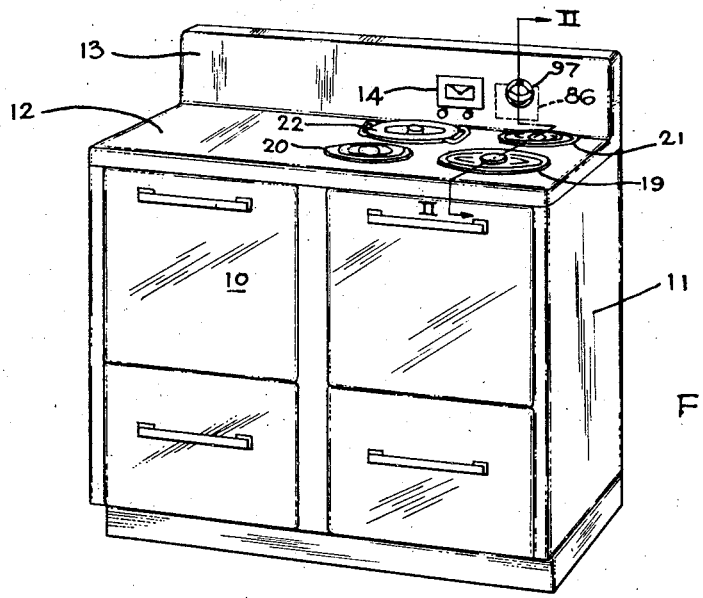
Fig. 1 is a perspective view of an electric cooking range in which the present invention is embodied.
Figure 2:
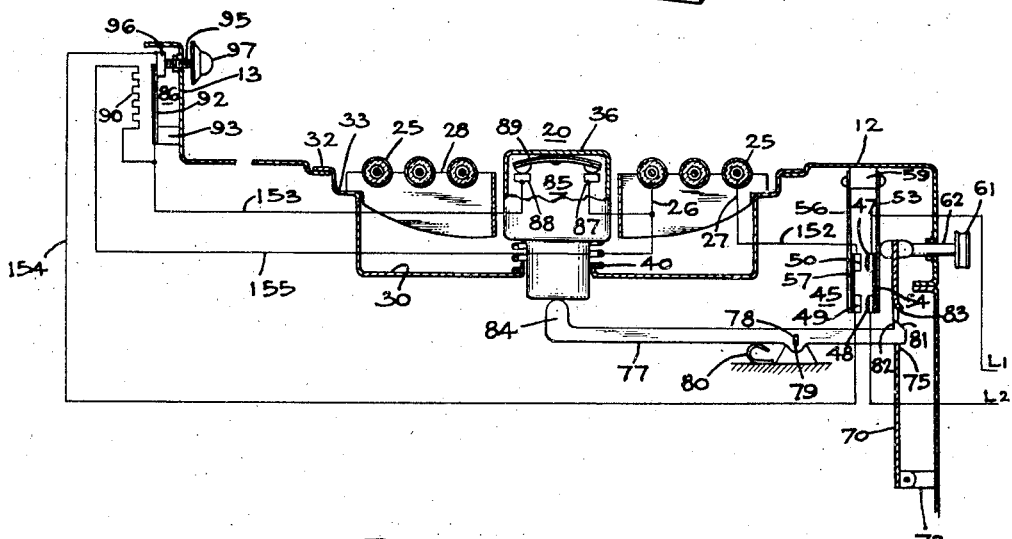
Fig. 2 is a fragmentary vertical section taken approximately along line II—II of Fig. 1, showing one of the surface units and the control arrangement therefor.
Figure 4:
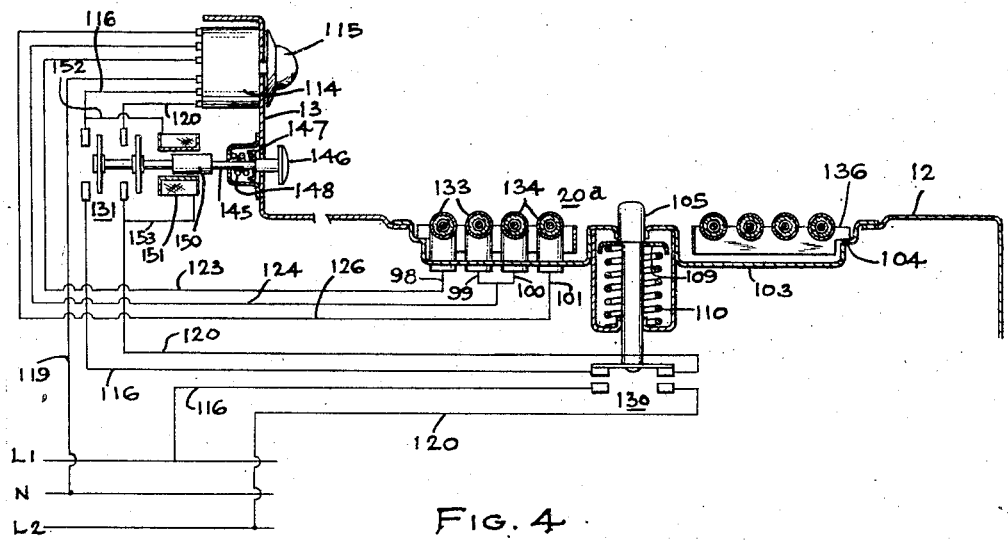
Figure 3:
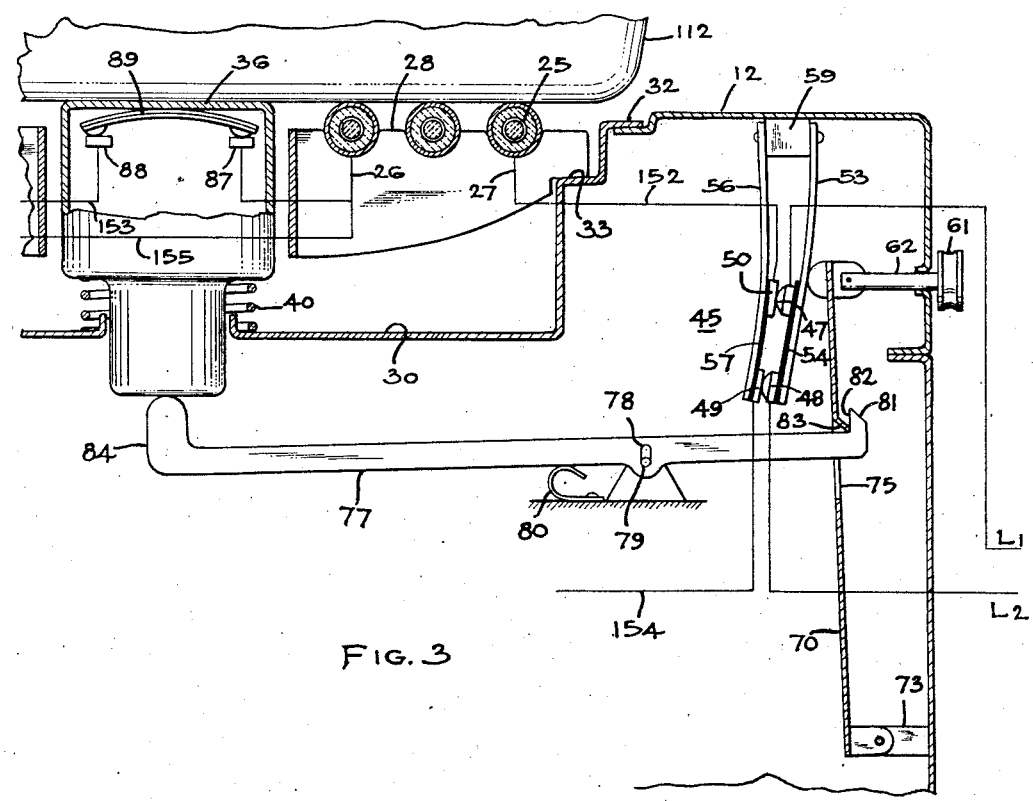

Fig. 3 is a view similar to Fig. 2 except that parts are omitted for clarity of illustration, with a cooking utensil positioned on the heating unit and showing the relationship of the parts of the control arrangement when the heating unit is connected to a power source; and, Fig. 4 is a fragmentary vertical section of a range similar to that shown in Fig. 1 but incorporating a modified form of the invention.

Figs. 1, 2 and 3

Referring to the drawings in detail, I show an electric range 10 which comprises three surface heating units 19, 20 and 21 and a deep well cooker 22. The unit 20 is provided with a control incorporating the present invention. Any one or all of the units 19 and 20 and the cooker 22 may be provided with a similar control. Other than the novel control referred to, the range 10 may be of conventional construction. The time clock 14 controls the oven in a well-known manner.

Referring to Figs. 2 and 3, the heating unit 20 comprises a single armored resistance element 25 which is spirally coiled to provide a flat grid. The ends of the resistance element 25 are provided with terminals indicated schematically at 26 and 27, for connecting the heating element to a suitable source of power. This grid is mounted on supporting arms 28 which rest on the shoulder 33 of a reflector pan 30, which in turn is supported on the range platform 12. The heating unit is adapted to support a cooking utensil placed thereon to be heated, as shown at 112 in Fig. 3. A casing or hollow button 36 extends through the center of the heating unit and the reflector pan 30. It is vertically movable and is biased upwardly by a spring 40 to a position in which it projects above the plane of the top of the heating unit.

The heating unit 20 may be energized from a suitable source of power, such as the line conductors $L_1$ and $L_2$. The control for controlling the supply of current from the line conductors to the heating unit 20 comprises a line switch 45, a wattage controller 86, and a thermostatic switch 85. The line switch includes a push button 61. It completes a connection to the line conductors L1 and L2 when a cooking utensil or the like is placed on the heating unit 20 and the button 61 is pushed in, and it opens the connection when the vessel is removed from the heating unit 20. The wattage controller 86 controls the average wattage input or rate of energization of the heating unit. In the present embodiment, in which the heating unit comprises a single heating element, the wattage controller effects such control by intermittently opening and closing the circuit to the heating unit and it is adjustable to vary the ratio of the "on" period to the "off" period to provide different rates of energization, and to a continuous "on" position and preferably also to a continuous "off" position. The thermostatic switch 85 supersedes the wattage controller 86 during the initial period of a cooking operation to provide continuous current or maximum rate of energization until the utensil placed on the heating unit is brought to the boiling temperature. The wattage controller 86 and the thermostatic switch 85 are in accordance with the invention of Edward Bletz, described and claimed in his application, Serial No. 406,781. The novelty of the present invention resides particularly in the line switch 45 and in its combination with the wattage controller and the thermostatic switch. These three parts of the control will now be described in greater detail.

The line switch 45 includes contacts 47 and 48 connected to the line conductors L1 and L2 and insulatedly mounted on a resilient member 53 through a dielectric member 54. It further includes a pair of cooperating contacts 49 and 50 adapted to be connected to the respective terminals 26 and 27 and insulatedly mounted on a resilient member 56 through a dielectric member 57. The upper ends of the members 53 and 56 are attached to the opposite sides of a stationary member 59.

The push button 61 is mounted on the outer end of a stem 62 which extends through the front wall of the range in alignment with the resilient member 53, so that by pushing the button 61 the resilient member 53 is moved to bring its contacts in engagement with the cooperating contacts to close the switch. The stem 62 is attached to the upper end of a member 70 which is pivoted at its lower end to a stationary block 73.

The line switch 45 is provided with a mechanism for latching it in closed position when it is closed while there is a utensil on the heating unit 20. This mechanism includes a lever 77 pivoted on a stationary fulcrum by means of an oversize opening 78 in the lever and a pin 79 which extends through the opening 78. A spring 80 biases the lever in clockwise direction. The right-hand end of the lever 77 extends through a slot 75 in the member 70 and is formed with an upwardly-extending hook 82 which is adapted to engage a struck-out portion 83 of the member 70 to hold the switch in closed position. The left-hand end of the lever 77 has an angular portion 84 thereon which bears against the bottom of the hollow button 36.

When a utensil is placed on the heating unit, the button 36 is depressed and the lever 77 is tilted counter-clockwise to the position shown in Fig. 3. This operation conditions the control for closing the circuit but does not in itself close the circuit. If the button 61 is now pushed in to close the switch, the struck-out portion 83 rides over the inclined surface 81, which is permitted by the oversize opening 78, and is latched in back of the hook 82 as shown in Fig. 3. The switch 45 is now latched in closed position and will remain closed as long as the utensil remains on the heating unit. When it is removed, the spring 80 moves the lever 77 in clockwise direction to release the member 70 and permit the resilient member 53 to return to the open switch position shown in Fig. 2.

The wattage controller 86 is located in back of the backsplasher 13 and includes a thermostatic or bimetal element 92 fixed at its lower end to a stationary dielectric member 93. At its other end, the bimetal element 92 is adapted to move into and out of engagement with a stationary contact 96. The wattage controller further includes a small or auxiliary heating element 90 adapted to heat the bimetal element 92, which moves to the left out of engagement with the contact 96 as its temperature is raised by the heating element. To make the wattage controller adjustable, the contact 96 is adapted to be moved toward or away from the bimetal element 92 by means of a knob 97 disposed on the front of the backsplasher 13. The knob may, for example, be mounted on a screw 95 threaded through the backsplasher and abutting the contact 96, the latter being movably mounted in a suitable manner as will be readily understood by one skilled in the art.

The heating element 90 and the bimetal element 92 are connected in series in the circuit through the heating element 25. This circuit extends from line conductor L1, through the switch contacts 47 and 50, the conductor 152, the terminal 27, the heating element 25, the terminal 26, the conductor 155, the heating element 90, the bimetal element 92, the contact 96, the conductor 154, and the switch contacts 49 and 48 to the line conductor L2. As current flows through the circuit, the temperature of the bimetal element 92 is raised by the heat from the heating element 90 and as it reaches a temperature determined by the setting of the knob 97, it deflects to the left out of engagement with the contact 96, thereby opening said circuit. The flow of heat from the heating element 90 is thus terminated and as the bimetal element 92 cools to the predetermined temperature, it moves into engagement with the contact 96, thereby reestablishing the circuit. The heating element 90 again heats the element 92 and the cycle of "on" and "off" periods is repeated.

By turning the knob 97 to move the contact 96 to the left, the ratio of "on" period to "off" period is increased since more heat is required to deflect the element 92 further to the left. Accordingly, the average wattage input to the heating unit and its rate of heat delivery to the utensil is increased. The contact 96 may be moved sufficiently to the left to remain in engagement with bimetal element 92, thereby providing a position of continuous energization or maximum heating. By moving the contact 96 to the right, the ratio of the "on" period to the "off" period is decreased, since less heat is required to move the bimetal element 92 out of engagement with the contact 96, and it is preferably movable sufficiently to the right to be out of engagement with the bimetal element 92 at room temperature, thereby providing a completely "off" position.

The pilot thermostat 85 is located in the upper portion of the hollow button 36 so as to be in close proximity to the bottom of a cooking utensil placed on the heating unit 20. This thermostat includes a pair of contacts 87 and 88 and a bimetal snap-acting element 89 having a pair of contacts thereon which normally bridge the contacts 87 and 88. The thermostatic switch 85 is connected, by means of a conductor 153, in shunt with the conductor 155 and the heating element 90. Accordingly, when the thermostatic switch is closed, the current is shunted therethrough and the heating element 90 is deenergized, thereby maintaining the bimetal element continuously in engagement with the contact 96.

Figs. 1, 2 and 3.—Operation

To initiate a cooking operation, the user first places the utensil 112 on the heating unit 20, which action tilts the lever 77 into counterclockwise direction, in which position it is adapted to latch the member 70. The user then pushes the button 61 to close the line switch 45, which is thereby latched in closed position by the engagement of the member 70 with the lever 77. Assuming that the wattage controller 86 has been left at a setting which is still suitable, this pushing of the button is the only control operation necessary to be effected by the user for the entire cooking operation.

Since the temperature of the utensil 112 is normally below the boiling temperature at the beginning of a cooking operation, the thermostatic switch 85 remains closed. Accordingly, the heating element 90 of the wattage controller is shunted and does not heat. Accordingly, the flow of current through the heating unit is continuous and delivers heat at its maximum rate to the utensil 112 to raise its temperature as quickly as possible to the boiling point. When the boiling point is reached, the thermostatic switch opens its contacts, causing the current to flow through the heating element 90. The wattage controller 86 thereby assumes control of the heating unit in accordance with the setting to which it has previously been adjusted. Such setting will normally provide a relatively low rate of energization such as that known as simmering. Such heating continues until the user lifts the utensil from the heating unit, at which time the lever 77 is tilted in clockwise direction to unlatch the member 70. Due to the resilience of the member 53, the line switch 45 thereupon opens the connection to the line conductors L₁ and L₂ to terminate all supply of heat.

It will thus be apparent that it is not necessary to turn the knob 97 to the "off" position at the end of a cooking operation, nor is it necessary to adjust it to the desired heating position every time that a cooking operation is initiated. The same setting of the wattage controller 86 will be found satisfactory for most cooking operations, so that the knob 97 may be left in the same position from one cooking operation to another and adjusted only when an unusual cooking operation is encountered. This means that, for most cooking operations, the only control operation necessary for the user to carry out is to push the button 61.

Figure 4

Referring now to Fig. 4, I show an embodiment in which electrical mechanism instead of a mechanical latch is employed for retaining a line switch in closed position only so long as there is a utensil positioned on the heating unit. In this embodiment, the heating unit 20a comprises two armored resistance elements 133 and 134 which are spirally coiled to provide a grid mounted on supporting arms 136. The ends of the latter rest on the shoulder 104 of a reflector pan 103, the latter being again supported on the platform of the range. A pin 105 extends vertically through the center of the heating unit and is biased upwardly by a compression spring 110, the upper end of which engages a pressure plate 109 which in turn bears against a shoulder on the pin 105. The ends of the two resistance elements are provided with terminals represented schematically by the reference characters 98 to 101 for connecting the heating unit to a suitable source of power.

The heating unit 20 may be energized from a suitable source of power, such as an Edison three-wire system including two outside conductors L₁ and L₂ and a neutral conductor N. A switch 114 is provided for connecting the resistance elements 133 and 134 to the line conductors in a manner well known in the art to give a plurality of different heats; for example, to connect the heating elements in parallel across the conductors L₁ and L₂ to give a high heat, to connect one of them across the same conductors to give a medium high heat, to connect both of them in series across the same conductors to give a medium heat, to connect one of them across the conductors L₁ and N to give a low heat and to connect both of them in series across the conductors L₁ and N to give a simmer heat. The switch 114 may be of a construction already well known in the art, so that further description thereof is not necessary. This switch is mounted on the back of the backsplasher 13, but may be disposed elsewhere. It includes a knob 115 provided on the front of the backsplasher for setting the switch to obtain the different degrees of heat specified above.

The switch 114 is connected to the conductors L₁, L₂, and N through conductors 116, 120 and 119, respectively. Conductors 123, 124 and 126 connect the switch 114 to the terminal 98, the two terminals 99 and 100 in common, and the terminal 101, respectively.

A two-pole switch 130 and a two-pole switch 131 are interposed in the conductors 116 and 120, so that if either of these switches is open, the heating unit cannot be energized. The switch 130 is actuated by the pin 105, described above, and is closed when the pin is depressed. The switch 131 includes a rod 145 on which the contact-bridging elements are mounted. Its forward end extends through the backsplasher and a push button 146 is mounted or formed thereon. It is biased to open circuit position by a spring 148 acting through a pressure plate 147. A solenoid including a core 150 mounted on the rod 145 and a coil 151 is adapted when energized to hold the switch 131 in closed position. The coil 151 is energized by a circuit 153 controlled by its own contacts.

Figure 4.—Operation

The operation of the embodiment shown in Fig. 4 is as follows: The cooking utensil or the like to be heated is positioned on the heating unit 20a, thereby closing the switch 130. The circuit is still open, however, at the switch 131. The user then pushes the button 146 to close the switch 131. The circuit is now completed to the switch 114, thereby placing the latter in control of the energization of the heating unit 20a. If the switch knob 115 is already in a heat position, then energization of the heating unit 20a is effected upon closing of the switch 131 at the rate determined by the position of the knob 115. If it is in the "off" position, then the heating unit is not energized until such time as the knob is moved to a heat position. It may be noted that the knob 115 may be turned at any time, but that the switch 114 can be effective to energize the heating unit only at such time as both switches 130 and 131 are closed.

Upon completing the cooking operation, the user merely lifts the utensil from the heating unit. This opens the switch 130 to interrupt the supply of electric current to the heating unit. Since the holding circuit for the solenoid 153 is also deenergized by such current interruption, the switch 131 is opened by the spring 148. Accordingly, the circuit cannot be reestablished until such time as both of the switches 130 and 131 are again closed by placing a utensil on the heating unit and pushing the button 146, respectively. In terminating the cooking operation, it is not necessary to turn the knob 115 to the "off" position, but it may be left undisturbed until such time as it is desired to energize the heating unit at a different rate than that for which the knob is set. In other words, where the same degree of heat is desired, the knob may be left in one position from one cooking operation to another and only actuated when a different degree of heat is desired.

Instead of having the pin 105 controlling the switch interposed in the conductors 116 and 120, it may actuate a switch in the holding circuit for the coil 151. In such case, the heating unit could be energized without placing a utensil thereon by merely pushing the button 146, but it would be energized only so long as the button is manually held in the closed circuit position. As soon as the button 146 is released, the spring 148 would reopen the switch 131 to deenergize the heating unit. Upon placing a utensil on the heating unit, however, pushing the button 146 would complete the holding circuit and the switch 131 would be held in closed position until the utensil is removed from the heating unit.

The single claim is directed to the embodiment shown in Fig. 4.

What is claimed is:

The combination with an electrical heating unit adapted to supply heat to a cooking utensil or the like and a source of power for said heating unit, of a switch for connecting said heating unit to said power source, said switch being biased to open position, means for moving said switch to closed position, electro-magnetic means for holding said switch in closed position, a circuit connecting said electro-magnetic means to said power source for energizing the same, said circuit being so arranged that it is open at all times that said switch is open, a second switch connected in said circuit, said second switch being moved to closed position by placing a cooking utensil or the like on said heating element, thereby completing the circuit from said power source to said electro-magnetic means and making the same effective to hold said first switch in closed position when moved to such position, said second switch being biased so as to move to open-circuit position when there is no cooking utensil or the like on said heating unit thereby opening the circuit from said power source to said electro-magnetic means and rendering said electro-magnetic means ineffective to hold said first switch in closed position when there is no cooking utensil or the like on said heating unit.

EARL K. CLARK.